June 4, 1963 H. G. BELL ET AL 3,091,769
APPARATUS AND METHOD FOR THE CONTINUOUS
PRODUCTION OF HOGSHEADS AND THE LIKE
Filed Nov. 1, 1955 4 Sheets-Sheet 1
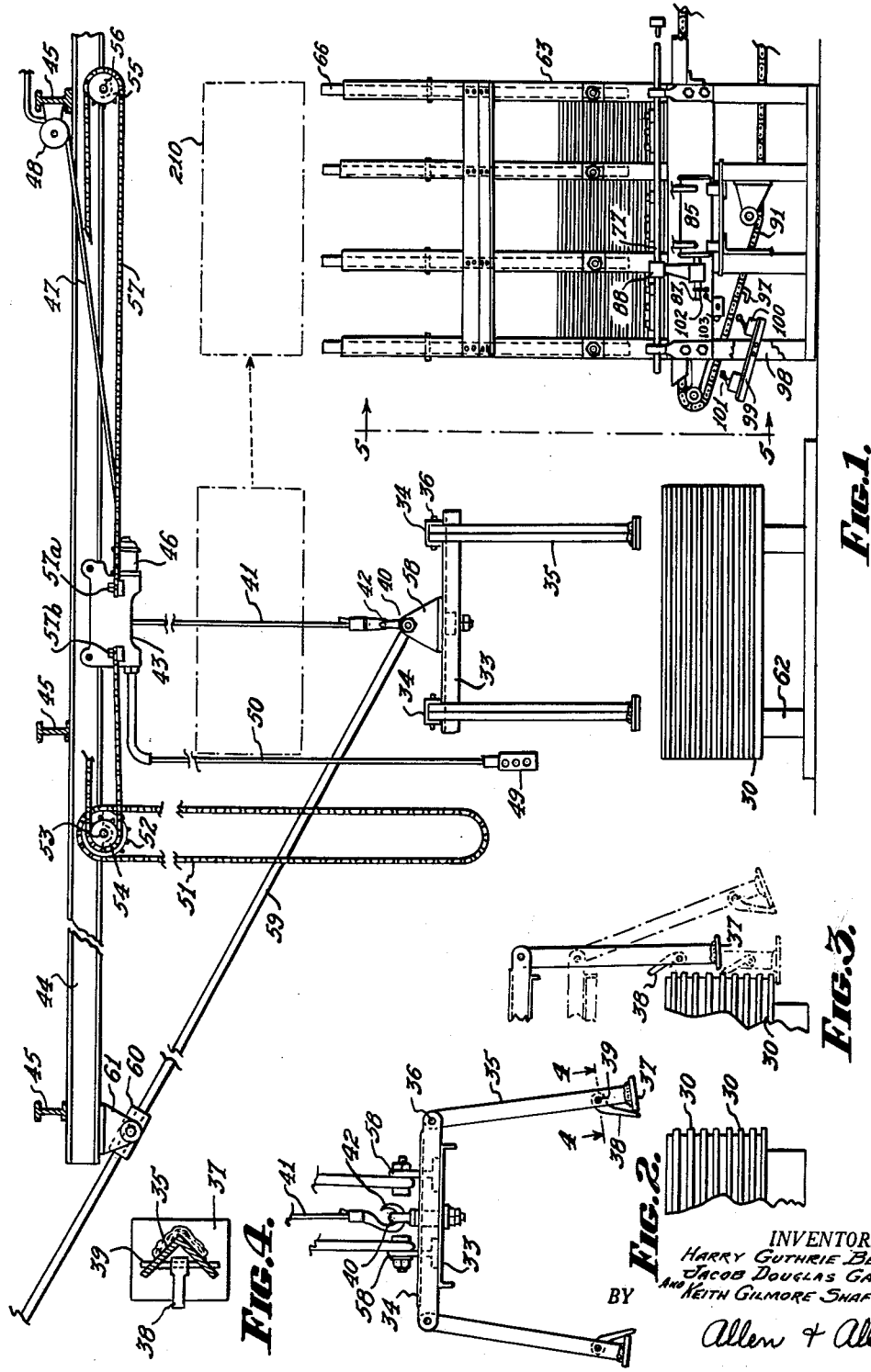

June 4, 1963

H. G. BELL ET AL 3,091,769

APPARATUS AND METHOD FOR THE CONTINUOUS
PRODUCTION OF HOGSHEADS AND THE LIKE

Filed Nov. 1, 1955

4 Sheets-Sheet 2

INVENTORS.
HARRY GUTHRIE BELL,
JACOB DOUGLAS GAY
AND KEITH GILMORE SHAFFER,
BY
Allen & Allen
ATTORNEYS.

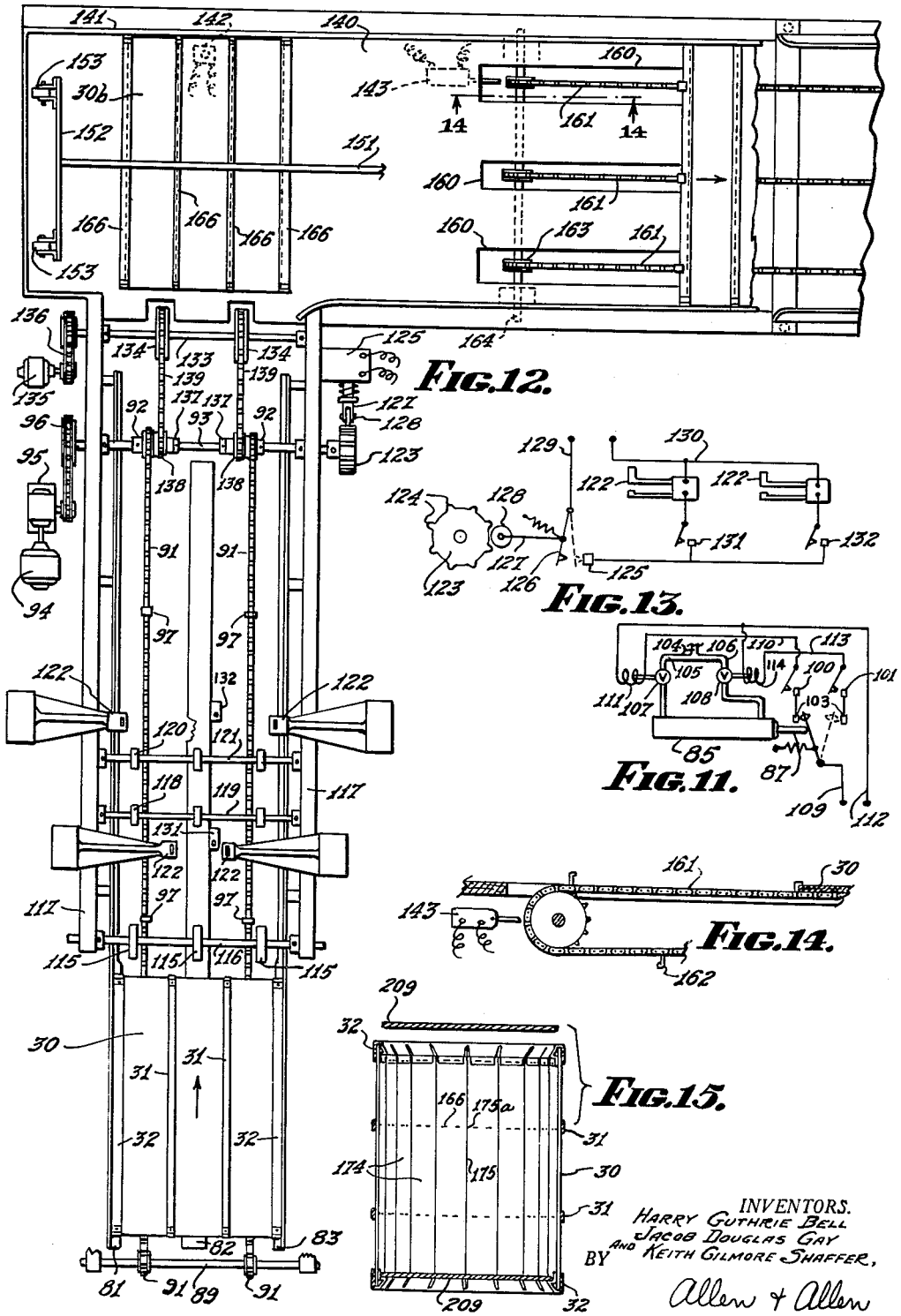

June 4, 1963
H. G. BELL ET AL
3,091,769
APPARATUS AND METHOD FOR THE CONTINUOUS
PRODUCTION OF HOGSHEADS AND THE LIKE
Filed Nov. 1, 1955
4 Sheets-Sheet 4
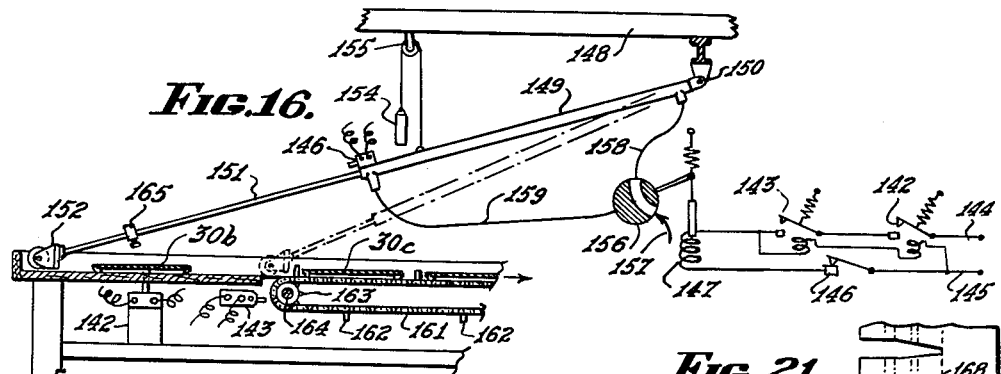
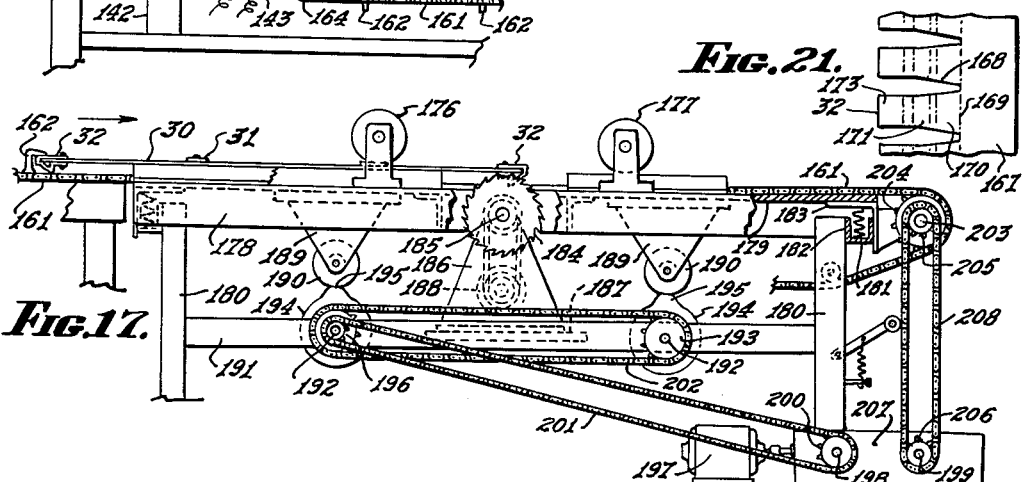
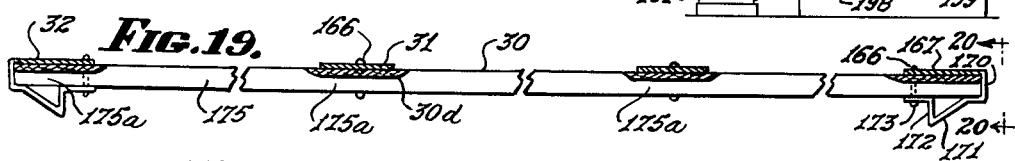
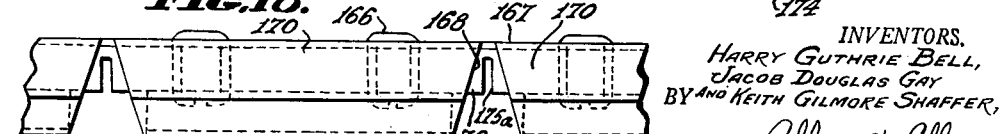
INVENTORS.
HARRY GUTHRIE BELL,
JACOB DOUGLAS GAY
AND KEITH GILMORE SHAFFER,
BY Allen & Allen
ATTORNEYS.

United States Patent Office 3,091,769
Patented June 4, 1963

3,091,769
APPARATUS AND METHOD FOR THE CONTINUOUS PRODUCTION OF HOGSHEADS AND THE LIKE
Harry Guthrie Bell, Jacob Douglas Gay, and Keith Gilmore Shaffer, Paris, Ky., assignors to The Gay-Bell Corporation, Paris, Ky., a corporation of Kentucky
Filed Nov. 1, 1955, Ser. No. 544,258
18 Claims. (Cl. 1—66)

Our invention has to do with the manufacture of hogsheads and the like and resides particularly in a method and apparatus for manufacturing items of this type continuously as distinguished from the piece by piece hand methods heretofore practiced.

Although the method and apparatus of our invention is perhaps best suited for the production of hogsheads of the general type shown in the application of Harry Guthrie Bell, filed May 24, 1955, bearing Serial Number 510,610 and entitled Improved Barrel and Barrel Head therefor, now Patent No. 2,862,639, issued December 2, 1958, it is to be understood that other types of barrels and similar items may be manufactured according to the teachings of this invention.

A very important object of our invention is to provide an apparatus and method by means of which hogsheads and the like may be manufactured rapidly with a minimum of labor.

Another object of our invention is to provide means for handling large numbers of the panels from which the hogsheads are to be made without injury to the panels.

Another important object of our invention is to provide a means and method by which hogsheads of superior quality and workmanship may be produced.

Yet another object of our invention is to provide a continuous set-up such that the panel may be started through the apparatus in a state of much incompleteness and automatically progressed through the system until it emerges as a hogshead section of rather complete form.

Figure 6:
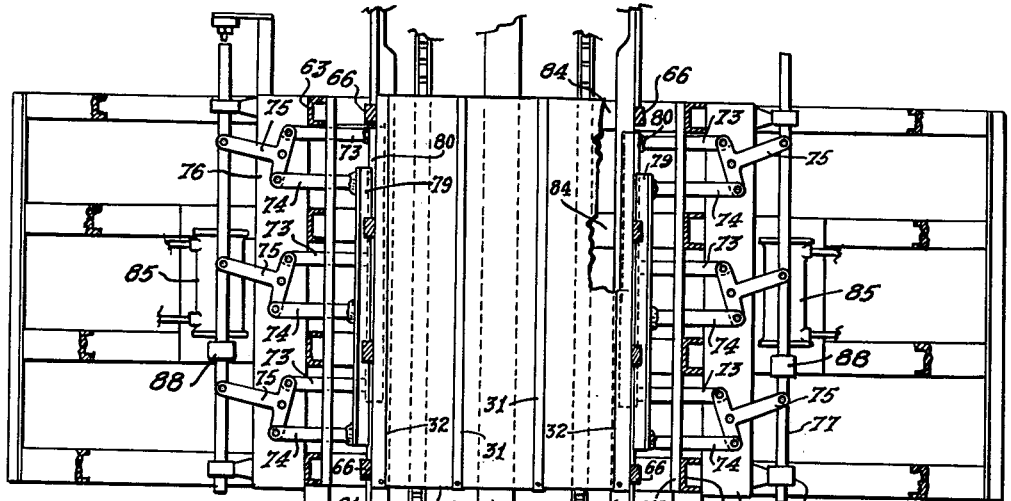
Figure 9:
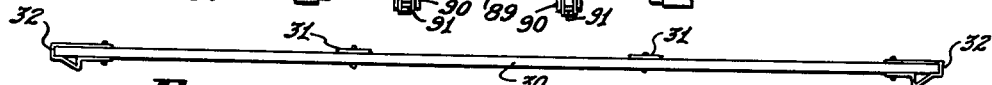
Figure 10:
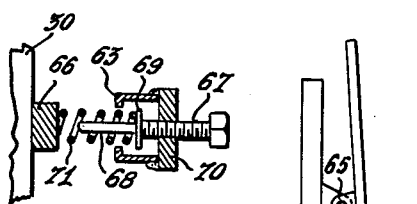
Figure 7:
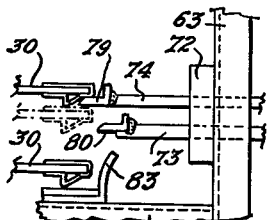
Figures 5, 8:
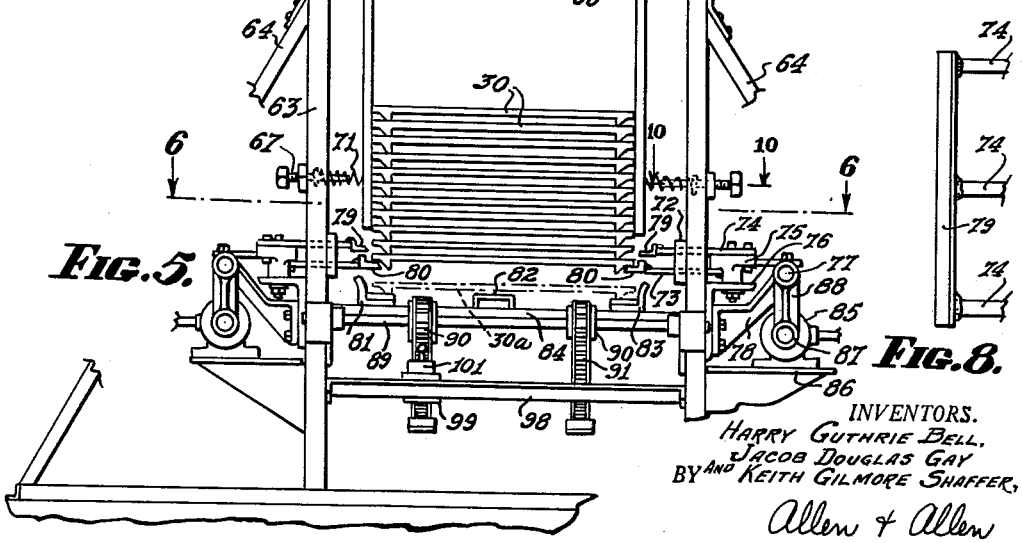

These and other objects of our invention will become apparent to those skilled in the art during the course of the following description and with reference to the accompanying drawings. In these drawings like numerals are employed to designate like parts throughout and FIGURE 1 is a side elevation of the loading station for loading the panels into the feeding device and of the feeding device which deposits the panels onto a conveyor, FIGURE 2 is a fragmentary end view of the loading mechanism including the grappling hooks used to lift a stack of panels and place same in the feeding mechanism, FIGURE 3 is a further fragmentary end view illustrating operation of the grappling hooks, FIGURE 4 is an enlarged section take on the line 4—4 of FIGURE 2, FIGURE 5 is a view taken along the line 5—5 of FIGURE 1, FIGURE 6 is a horizontal section taken on the line 6—6 of FIGURE 5, FIGURE 7 is an enlarged fragmentary view illustrating operation of the means for feeding a panel from a stack of panels onto a conveyor, FIGURE 8 is a fragmentary plan view showing a portion of the panel feed means, FIGURE 9 is an end view of a panel which will be transformed into a hogshead by the method and means of this invention, FIGURE 10 is an enlarged fragmentary sectional view taken along the line 10—10 of FIGURE 5, FIGURE 11 is a diagrammatic view of the control means for actuating the panel feed mechanism, FIGURE 12 is a fragmentary plan view, with part broken away, showing the general arrangement by means of which a panel is taken from the feed mechanism, carried forward beneath stapling heads and thereafter transferred to a right angle conveyor preparatory to the sawing operation, FIGURE 13 is a diagrammatic view illustrating the control means for the stapling heads, FIGURE 14 is a fragmentary sectional view taken along the line 14—14 of FIGURE 12, FIGURE 15 is a vertical sectional view taken through a finished hogshead with the head thereof shown in exploded relation, FIGURE 16 is a semi-diagrammatic view illustrating the means for advancing the stapled panels onto the conveyor of the saw table, FIGURE 17 is a side view, with parts broken away, showing an exemplary saw table, FIGURE 18 is a fragmentary plan view of a completed panel, FIGURE 19 is a section taken on the line 19—19 of FIGURE 18, FIGURE 20 is an enlarged fragmentary side view of a completed panel, and FIGURE 21 is a fragmentary plan view of a hoop and liner before it is bent and secured on a hogshead panel.

*The Hogshead Panel and Hogshead Made Therefrom*

In order that our invention may be made most clear we shall describe the panel which comprises the starting material and the hogshead which will be made therefrom by practicing our invention as embodied in the apparatus and method to be explained shortly. As explained in the aforementioned co-pending application Serial No. 510,610 a most satisfactory way of forming a hogshead is to start with a plywood panel or plurality of panels of a width which will determine the diameter of the hogshead and of a length which will determine the height of such hogshead. This plywood panel will normally be handled flat and is imperforate. Such a panel is shown in FIGURE 9 as shown at 30.

Operators will take a panel 30 and temporarily fasten thereon a pair of hoops 31 and a pair of hoops-and-liners 32. These hoops and hoops-and-liners will be secured with a minimum number of staples or the like, or by application of hinge members through the perforations that have been previously embossed in the hoops and hoops-and-liners, just sufficient to hold such members in proper position on the panel 30. The formation of this panel and the initial positioning of the hoops and hoops-and-liners does not constitute a part of the continuous operation forming the basis of this invention, rather, our invention has to do with the handling of a plurality of these panel members 30–32 to transform them continuously into a series of hogsheads.

FIGURES 18 through 21 show portions of the completed hogshead panel while FIGURE 15 shows such completed panel manipulated to form the actual hogshead. The precise showing of these figures will be discussed more fully in connection with the description of the method and means by which the unit of FIGURE 9 is brought to the condition of FIGURE 15, such method and means constituting the basis of our invention.

*The Loading Mechanism*

Referring now particularly to FIGURES 1 through 4 we have illustrated the means by which a load of panels 30 are placed within the feed mechanism to be described. This load mechanism comprises a plate 33 across two ends of which are fixed a pair of inverted channel members 34. The members 34 extend beyond the edges of the plate 33. To each end of each member 34 is pivoted a depending arm 35, there being a pin 36 passing through this arm and the channel member 34.

Fixed to the lower end of each of the arms 35 is a foot member 37. A guard 38 is pivoted to the arm 35 as indicated at 39, the lower end of the guard 38 normally abutting the foot member 37. It will be understood that when the guard 38 is moved away from the foot 37 such foot may engage beneath the lowermost of a stack of panels 30 as will be described more fully shortly.

An I-bolt 40 is fastened centrally of the plate 33. The plate 33 and related mechanism is supported from a cable 41 by means of engagement between the I-bolt 40 and hook 42. The cable 41 is wound about a conventional drum (not shown) supported in the carriage 43 which is mounted for movement on the I-beam 44 which in turn is fixed to other I-beams 45 in a suitable building or factory. Also mounted on the carriage 43 is the motor 46 which operates the drum and cable 41.

The motor 46 is supplied with current through the electric conduit 47 which is mounted on a take-up reel 48 supported from one of the I-beams 45. Actuation of the motor 46 to raise or lower the plate 33 and related mechanism through the cable 41 is determined by the operation of the switch 49 mounted on the conduit 50. This arrangement employs conventional means to raise or lower the plate 33 depending on which buttons of the switch 49 are actuated.

The carriage 43 may be moved along the channel member 44 by pulling the endless chain 51 which engages a sprocket 52 fixed on a shaft 50 suitably supported from the frame structure 44. Also mounted on the shaft 53 is a sprocket 54. A similar sprocket 55 is mounted on a shaft 56 supported from the frame member 44. A chain 57 passes over the sprockets 54 and 55 and is engaged at either end to the carriage 43 as indicated at 57a and 57b. Obviously clockwise movement of the shaft 53 as determined by pulling of the chain 51 will move the carriage to the left as viewed in FIGURE 1 with counterclockwise movement of the shaft 53 resulting in the carriage being moved to the right in this same figure.

We have provided means for preventing undue sway of the plate 33 and its associated loading mechanism. Fixed to the plate 33 is a pair of side members 58. A rod 59 is pivotally connected to each of the members 58. Each of these two rods 59 slides within a bearing 60 which in turn is pivotally mounted on a lug 61 fixed to the frame structure 44. The rods 59 extend sufficiently beyond the ends of the bearings 60 to permit the necessary lateral movement or shifting of the carriage 43 when the stack of panels 30 is taken from the skid 62, hoisted and moved to the feed mechanism to be described. These rods 59, arranged as described, prevent swinging movement of the stack of panels supported from the plate 33 by the arms 35 and foot members 37. Since there is considerable weight to the stack of panels 30 and since this stack must be placed within a feed mechanism of relatively confining structure it is quite important that the stack not be swinging to and fro when one endeavors to place it within such feed mechanism.

The foot members 37 are engaged beneath the stack of panels 30 by lowering the plate 33. As the arms 35 approach the stack of panels 30 it might be necessary to guide them to the outer edges of the panels 30. Continued downward movement of these arms will cause the guards 38 to catch on the edge of the panel 30 and be moved from the position shown in FIGURE 2 to that shown in FIGURE 3. When the arms 35 have been lowered sufficient to permit foot 37 to engage beneath the lowermost panel 30 such engagement will sometimes be effected automatically because of the pivoted arrangement between the arm 35 and channel 34. If not, however, it is a simple matter to manipulate the arm 35 so as to insure that the foot 37 will be beneath this lowermost panel. This having been done the mechanism may be raised by actuating the cable 41 through the control 49.

After the stack of panels 30 have been lowered into the feed mechanism the arms 35 are moved away from the panels 30. When this happens the guards 38 fall to the position shown in FIGURE 2. Now upon the arms 35 being raised the member 37 will be prevented from catching any of the panels by reason of the guard 38 preventing the extended portion of the foot 37 from moving between the panels; the arms 35 and members 37 will simply slide up the edge of the stack which will be engaged only by the guard 38 as the plate 33 is raised preparatory to bringing the mechanism into position to engage another stack of panels.

*The Feed Mechanism*

Our feed mechanism is perhaps best shown in FIGURES 1 and 5 through 11. Suitably anchored in the floor of the building are a plurality of upstanding frame members 63. We have shown four of these channel members along each side of the feed mechanism. Lateral supports 64 are provided for these frame members 63. Pivotally mounted to each of the members 63 as indicated at 65 is a side guide 66. Referring now especially to FIGURE 10 it will be observed that there is a threaded bolt 67 having an extension 68 and spring abutment 69 fixed in each of the members 63. This bolt 67 may pass through a member 70 which abuts the channel number 63. A spring 71 bears against the side guide 66 and the abutment 69. Obviously the degree to which the spring 71 acts on the side guide 66 may be regulated by adjustment of the bolt 67.

Fixed laterally along each row of member 63 is a plate 72. This plate 72 is perforated to permit reciprocable movement of the arms 73 and 74 which are attached to a T-member 75 pivotally mounted on a bracket 76 fixed in the frame structure 63. There are three pairs of the members 73 and 74 along each side of the feed mechanism as most clearly appears in FIGURE 6. Each of the members 75 is connected to a shaft or rod 77 mounted in suitable bearings provided in the frame structure 63. The shaft 77 may be shifted in its bearings 78 as will be described.

A support plate 79 is fixed to the ends of the arms 74 along one side of the feed mechanism. This is perhaps best seen in FIGURES 6 and 8. The structure for the other side of this mechanism is the same. Another support plate 80 is fixed to the ends of the arms 73 along each side of the feed mechanism.

As seen in FIGURE 5 the stack of panels 30 is resting on the support plates 80 which are fixed to the arms 73. Beneath the members 80 are three longitudinal members 81, 82 and 83 which are fixed on suitable cross braces 84 fixed in the frame structure 83.

A panel 30a, shown in dotted lines, is resting on the members 81, 82 and 83. This panel is now in position to be engaged by conveyors and moved from the feed station to the stapling means. As best seen in FIGURES 5, 6 and 11 an air cylinder 85 is mounted on a suitable bracket 86 extending from the frame structure 63. There is a cylinder 85 at each side of the feed mechanism. Within each cylinder there is a piston, not shown, having a piston rod 87. The piston rod 87 is connected to the shaft 77 by a suitable member 88. Movement of the piston rod 87 will thus produce corresponding movement of the shaft 77 to which the T-members 75 are fixed.

Mounted in suitable brackets provided in the frame structure is a shaft 89 having a pair of sprockets 90 fixed thereon. A pair of endless chains 91 pass about these sprockets and ones similarly located on sprockets 92 fixed to a shaft 93, see FIGURE 12. The shaft 93, and consequently the chains 91, is driven from a motor 94 through suitable reduction means 95 and chain 96. The chains 91 each have catch members 97 to engage the edge of a panel 30 when put in position on the supports 81, 82 and 83. Mounted on a bar 98, see FIGURES 1 and 5, is a member 99 having limit switches 100 and 101 fixed thereon. As the chains 91 are moved to bring the members 97 into position to engage a panel member 30, these catch members 97 will first trip the limit switch 100 and then the limit switch 101. The result of this movement and action will now be explained in connection with the showing of FIGURE 11.

Feed Mechanism Controls

In FIGURE 11 the piston rod 87 is shown in its retracted position. This corresponds with the showing of FIGURE 1. It is in this position of the piston rod 87 that the support members 80 are advanced to support the stack of panels 30 as shown in FIGURE 5. Also provided is a switch 103 which may be engaged by a member 102 on the piston rod 87, see FIGURE 1. A conduit 104 extends from a supply of fluid pressure to the branch conduits 105 and 106 regulated by the solenoid controlled valves 107 and 108 respectively.

With the piston rod 87 in the position shown in FIGURES 1 and 11 the switch 103 is closed by contact with the member 102 carried by the piston rod 87. As the catch member 97 on one of the chains 91 moves to position to engage the panel member 30a resting on the supports 81, 82 and 83 it will first engage the limit switch 100. When the switch 100 is closed in the manner just described a circuit is completed from a suitable source of current through the lead 109, the left-hand portion of the switch 103 as viewed in FIGURE 11, switch 100, lead 110, solenoid 111 and return lead 112. Actuation of the solenoid 111 in this manner will cause fluid to be admitted to the left-hand end of the cylinder 85 as viewed in FIGURE 11, with the result that the piston rod 87 is moved to the right. Movement of the piston rod 87 from its retracted position to its projected position will move the shaft 87 in like manner. Such movement of the shaft 77 will cause the T-members 75 at the right side of the mechanism as viewed in FIGURE 6 to pivot in a clockwise direction about the respective pivot points of such T-members 75 on the bracket 76. Such clockwise movement of the T-members 75 will cause the arms 73 to move away from the stack of panels 30 while at the same time causing the arms 74 to move toward the stack of panels 30. It will be understood that the piston arrangement for the left side of the apparatus of FIGURE 6 will work in corresponding manner.

Movement of the arms 73 away from the panels 30 will cause the support members 80 to be withdrawn from beneath the lowermost panel 30 with the result that it will fall to the position of the panel 30a which has since been moved away by action of the conveyor chains 91. At the same time the support 79 will be moved under the stack of panels 30 so that only the lowermost panel will fall to position on the supports 81, 82 and 83. Actuation of the solenoid 111 by movement of the piston rod 87 from retracted position to projected position in the manner just described will accomplish that which is emphasized in FIGURE 7. Here it will be observed that the support members 80 have been moved so as to permit the panel indicated in dotted lines to fall to the position indicated in solid lines on the support 83 while at the same time the support 79 has been moved under the balance of the stack of panels.

Continued movement of the conveyor chains 91 will eventually cause the catch member 97 to strike the second limit switch 101. When this happens there will be a circuit completed between the lead 109, the right-hand portion of the switch 103, the switch 101, the lead 113, the solenoid 114 and the return lead 112.

Actuation of the solenoid 114 in this manner will cause the valve 108 to admit fluid pressure to the right-hand side of the cylinder 85 as viewed in FIGURE 11 with the result that the piston rod 87 will again be moved to its initial retracted position. When this happens the shaft 77 will also be moved with the result that the T-members at the right side of FIGURE 6 will now be moved in a counterclockwise direction to their original position as shown in this figure. Such counter-clockwise movement of the T-members 75 results in the members 73 being moved toward the panels 30 and the members 74 being moved away from the panels 30. The action just described will result in that panel 30 which was above the lowermost panel 30 being moved from the support 79 to the support 80, see FIGURE 7. Upon completion of this operation there will then be a panel supported on the member 80 which will be ready to be dropped to the supports 81, 82 and 83 when the switch 100 is next actuated by a catch member 97.

From the foregoing it will be observed that the operation of the described parts is such that first there is a stack of panels 30 supported on the members 80 of the arms 73. Upon actuation of the switch 100 by contact with the catch member 97 mounted on one of the chains 91 the members 80 will be withdrawn from the stack of panels so that the lowermost panel may drop to the supports 81, 82 and 83. At the same time, however, the member 79 will move into the stack above this lowermost panel so as to prevent any other panels from falling on that which has been moved to the lower supports. Actuation of the switch 101 by continued movement of the catch member 97 will now cause the members 79 to be withdrawn and the members 80 to be projected beneath the remaining panels so that these panels are permitted to drop from the level of the support member 79 to the level wherein they are supported on the members 80. This cycle having been completed it will be apparent that upon next actuation of the switch 100 again a single panel will be permitted to fall upon the supports 81, 82 and 83. At this time it should be emphasized that the spring-biased side guides 66 insure proper functioning of the members 79 and 80 since these side guides will support some of the weight of the stack of panels 30. Were it not for these side guides it might be that the weight of the panels 30 would be so great as to cause the panels to move downward too quickly for the switching of the members 79 and 80 or the weight of the whole stack of panels on such members might cause undue bending and the like which would eventually render the mechanism inoperative. We find it very desirable, therefore to employ the side guides in the manner illustrated.

The Stapling Apparatus

Referring now to FIGURES 12 and 13 we have illustrated the means for permanently attaching the hoops 31 and hoops and liners 32 to the panels 30. Prior to the bringing of a stack of panels 30 on the skid 62 to a position for loading the feed mechanism, each such panel had the hoops 31 and hoops and liners 32 temporarily fastened by just a few staples or the like. Such panels will now be assumed to have been brought to the position indicated at the lowermost part of FIGURE 12 successively by the loading and feed mechanisms heretofore described.

When the catch members 97 on the conveyor chains 91 engage the lower edge of the panel 30 this panel will be moved toward the mechanism indicated in the upper end of FIGURE 12. As the panel so moves it will pass under a series of hold-down rollers 115 mounted on a shaft 116 supported in suitable lateral frame members 117. Additional hold-down rollers 118 are mounted on the shaft 119 while other rollers 120 are mounted on the shaft 121, both of these last-mentioned shafts being supported in the frame members 117. These hold-down rollers 115, 118 and 120 insure proper positioning of the panel 30 on the supports 81, 82 and 83 during the actuation of the stapling heads.

In FIGURE 12 we have illustrated four stapling heads which may be considered as electrically driven or actuated. It is apparent that these may be pneumatically operated and the particular style of stapling head does not constitute a limitation on this invention. Suffice it to say that each head 122 is capable of driving a staple through the hoop 31, or hoop and liner 32, and the plywood panel 30 itself whereby to secure such hoop or hoop and liner to the panel.

As earlier explained the panels 30 are fed from the feed mechanism by means of long conveyor chains 91 having catch members 97 which engage behind the panels 30 and move them along the elongated supports 81, 82 and 83. These chains are driven by the motor 94 as explained. Mounted on one end of the shaft 93 is a cam wheel 123 having a series of projections 124 thereon. A switch 125 has a spring-biased member 126 attached to an arm 127 on which is mounted a roller 128 which bears against the cam wheel 123.

The switch 125 is in a circuit with leads 129 and 130, this circuit including the pair of switches 131 and 132. Closing of the switches 125 and 131 will actuate the electric stapling heads 122 which are in position to register with the hoops 31 on the panel 30. Closing of the switches 125 and 132 will actuate the pair of stapling heads 122 which register with the hoops and liners 32 of the panel 30. In operation it will be observed that the motor 94 not only drives the conveyor chains 91 which push the panels 30 through the stapling mechanism but also this motor actuates the cam wheel 123 for periodically closing the switch 125. The switches 131 and 132 are normally open. These switches are closed by the weight of the panel 30 in passing over them. When the catch members 97 on the conveyor chains 91 have so moved the panel 30 that the leading edge thereof will strike and thereby close the switch 131, staples will be driven through the hoops 31 and clinched on the under side of the panel each time a projection 124 on the cam wheel 123 bears against the roller 128 to bring the member 126 into position to close the switch 125.

Since the switches 131 and 132 are spaced from one another it will be apparent that a number of staples will have been driven into the hoops 31 prior to the time that the switch 132 is closed. Upon closing of the switch 132 by the panel 30 passing thereover, continued periodic closing of the switch 125 will result in staples being driven into the hoops and liners 32 as well as into the hoops 31. Simultaneous driving of staples into the hoops 31 and hoops and liners 32, however, exists only for a relatively short time of the stapling operation. When the rear end of the panel 30 releases the switch 131 continued movement of such panel will result only in additional staples being placed in the hoops and liners 32, the hoops 31 now having been fully stapled. And finally when the panel 30 clears the switch 132 all stapling will cease and the members 31 and 32 will be in secured position on the panel 30. We have found it desirable to actuate the various stapling heads simultaneously as this insures a more secure positioning of the staples. In addition we have found it desirable not to actuate all four of the stapling heads for too much of the stapling time by first starting the stapling of the hoops 31. By not bringing the stapling heads for the hoops and liners 32 into play for a given time, we reduce the total strain to which the panel would be subjected if all four stapling heads 122 were so arranged as to act more or less simultaneously on the hoops 31 and hoops and liners 32 from their very first passing under the hold-down rollers 115. In other words, if all four stapling heads 122 were placed substantially in line one with the other there would be an undue amount of strain placed across the panel at any given time these heads were actuated. Although the stapling operation could be accomplished quicker by so arranging these heads we have found that the arrangement illustrated in FIGURE 12 will do a better job with less strain on the panel and equipment. In its broadest aspects, however, we do not intend to be prevented from claiming our invention in terms broad enough to include arranging all four stapling heads substantially in a transverse line with respect to the panel passing therebeneath although the preferred arrangement is that which is illustrated.

*Transfer Means*

Still referring to FIGURE 12 we have illustrated means for quickly moving the stapled panel from the conveyor chains 91 into position to be fed to the sawing means. During the stapling operation just described the panel was moved at a relatively slow rate. In order to get this panel into position for right angle movement toward the solid table to be described it is necessary to move the stapled panel some little distance. There is no reason for this last-mentioned movement being so slow as that required for the stapling operation. We have, therefore, provided an arrangement for insuring quicker movement at this stage of the operation.

Mounted in the ends of the frame members 117 is a shaft 133 on which there is fixed a pair of sprockets 134. This shaft and these sprockets are driven from a motor 135 through suitable connection means 136. Loosely mounted between the sprockets 92 and bearing members 137 is a pair of sprockets 138 on the shaft 93. Chains 139 connect the pairs of sprockets 134 and 138. We have found it preferable to mount the shaft 133 lower than the shaft 93 so that the panels 30 are being moved downwardly as they leave the conveyor chains 91. By the arrangement just described the chains 139 may be driven considerably faster than the chains 91 while at the same time avoiding a duplication of structure. Thus when the panel 30 is moved onto the fast-moving, downwardly sloping chains 139 such panel is quickly moved to the position indicated at 30b in FIGURE 12. When in this position the panel is now ready to be fed towards and through the saw mechanism as will be described.

*Saw Table and Related Feed Mechanism*

The chains 139 bring a panel to a frame structure having a supporting surface 140 and upstanding sides 141. A panel delivered to this structure will take the position of the panel 30b shown in FIGURE 12. When this panel rests on the support 140 and abuts the far side 141 it will close a switch 142.

Referring now to FIGURES 12, 14, 16 and 17 we will describe the feed control for the saw table. The aforementioned switch 142 is in an electric circuit which includes the switch 143, the leads 144 and 145 from a source of electric current, the switch 146 and the solenoid 147. The switches 142 and 143 are normally open while the switch 146 is normally closed.

Pivotally connected to overhead frame structure 148 is an elongated cylinder 149. The pivotal connection of this cylinder to the frame structure is indicated at 150. A piston, not shown, within the cylinder 149 has a rod 151 to the projecting end of which is fixed a drag or rake member 152. This drag member 152 may have rollers 153 which rest on the support surface 140. The cylinder 149 may have a counterweight 154 passing over a pulley 155 fastened to the frame structure 148.

We have shown the cylinder as being pneumatically operated. Obviously any suitable fluid pressure may be utilized. At 156 we have shown a valve which will direct fluid pressure entering from a suitable source as indicated by the arrow 157 to either end of the cylinder 149 through the conduits 158 and 159. The normal position of the valve 156 as controlled by the solenoid 147 is such as to direct fluid pressure through the conduit 158 so as to maintain the piston rod 151 and drag 152 in the position shown in FIGURES 12 and 16.

As perhaps best seen in FIGURE 12 the support table or frame 140 is cut away as indicated at the plurality of locations 160. Conveyor chains 161 are located beneath these cutaway portions and are provided with catch members 162 adapted to engage behind a hogshead panel and push it through the saw area. The drag 152 will bring a panel 30 into position to be engaged by these catch members in the manner to be described.

As above stated the panel 30 when delivered to the frame structure 140 will close the switch 142. As the chains 161 are rotated about their sprockets including those indicated at 163 on the shaft 164 the catch member 162 will engage the switch 143 and close same. Closing of the switches 142 and 143 in this manner will complete a circuit through the solenoid 147 whereby to cause the valve 156 to shift and deliver air to the left-hand end of the cylinder 149 as viewed in FIGURE 16. This will cause the piston rod 151 to be retracted with the result that the drag 152 will engage the panel 30 and move it into position to be engaged by the catch members 162 on the conveyor chains 161. The piston rod 151 will thus be moved to the dotted line position of FIGURE 16.

When the piston rod 151 reaches its full retracted position a member 165 fixed thereto will engage the normally closed switch 146 and cause it to be opened. When the hold circuit including this switch 146 is thus broken the switches 142 and 143 will be moved to their open position under spring action. This will cause the circuit to the solenoid 147 to be broken with the result that the spring-biased valve member 156 will return to that position wherein the fluid pressure will be discharged through the conduit 158 rather than the conduit 159. Fluid passing through the conduit 158 will force the piston rod 151 and drag 152 to return to the position indicated in full lines in FIGURE 16. As this happens the member 165 will move out of contact with the switch 146 whereupon it will return to its closed position and all the various switches and control mechanism will again appear as illustrated in FIGURE 16. A panel having thus been moved from the position indicated at 30b in FIGURE 12 to that indicated at 30c in FIGURE 16 will be engaged by the catch members 162 on the conveyors 161 and moved through the saw mechanism to be described. Upon another panel contacting the switch 142 the operation may be repeated upon the next actuation of the switch 143 as occurs when it is struck by a catch member 162 on the conveyor 161 as explained.

*The Saw Means*

Referring now particularly to FIGURE 17 we will describe the saw means used to transform the panel 30 into an actual barrel or hogshead section including staves. In order to make clear the function of the saw means we shall describe the panel section we desire to obtain. This is best seen with reference to FIGURES 9 and 18 through 21, the completed hogshead being shown in FIGURE 15. FIGURE 9 shows a hogshead panel 30 with the hoops 31 and hoops and liners 32 temporarily fastened in place by a few staples. The aforementioned mechanisms permanently stapled these members in these places as perhaps best seen in FIGURE 12 where the rows of staples are indicated at 166. It is now necessary to cut this panel so as to form the staves in such a way as to make it possible to form a cylindrical hogshead or barrel from such panel.

In FIG. 21 we have shown a portion of the hoop and liner in flat condition. This hoop and liner 32 was placed on the panel 30 so as to provide a flat section 167 lying across what will be the outside of the upper and lower ends of the hogshead. This hoop and liner 32 is cut away as indicated at 168 and bent on the line 169 so as to form a plurality of segments 170 which lie flush against either the top or bottom end of the hogshead panel.

Still referring to FIGURES 19 and 21 it will be observed that the hoop and liner 32 is bent inwardly from the member 170 to form the flange 171. This flange is return-bent toward the panel 30 as indicated at 172. A further flat section 173 is also provided and it will be observed that the staples 166 pass through both the flat section 167 and the flat section 173 just mentioned.

In order to define the staves which are indicated at 174 in FIGURE 18, this figure representing a bottom plan view of a panel 30 after it has been sawed, it is necessary to saw completely through the panel in the panel area between the hoops and hoops and liners while at the same time grooving the panel area directly beneath the hoops and hoops and liners. Obviously it is not desirable for the saw blade to contact the hoops or hoops and liners. The lines of cut imparted by the saw blades are indicated at 175. Those portions of these cuts which do not extend clear through the panel 30 but which groove the panel only are indicated at 175a. These lines of cut 175 including the straight-lined grooved areas 175a, pass between the segments 170 of the hoops and liners 32, these segments 170 being determined by the cutaway areas 168 best seen in FIGURES 20 and 21. FIGURE 19 emphasizes the fact that the lines of cut 175 and grooves 175a are so located as to cut completely through the panel 30 in the areas between the hoops and hoops and liners while at the same time leaving a portion of the panel 30 lying beneath the hoops and hoops and liners intact as indicated at 30d. FIGURE 17 illustrates the mechanisms by which these lines of cut and grooves are imparted to the panel 30b of FIGURE 12 in order to bring it to the condition of FIGURE 18.

Referring now to FIGURE 17 there is shown a panel 30 being moved by the catch members 162 secured to the conveyor chains 161. As this panel is so moved it will pass under a plurality of hold-down rollers, which may be spring-biased, as indicated at 176 and 177. These rollers may be mounted on stands fixed to the table structure generally indicated at 178.

The upper support surface of the table 178 is indicated at 179. There are a plurality of posts 180 which maintain this structure a suitable distance from the floor level. We prefer that the table structure 178, 179 be spring-mounted with respect to the posts 180. To this end we provide these posts with members 181 which constitute walls within which springs 182 may be placed. These springs 182 may bear against the top table structure 179 or against flange plates 183 which serve to keep the table from shifting laterally or longitudinally.

A plurality of circular saw blades 184 are mounted on a shaft 185 having suitable bearings in a bracket 186 which is based at 187 on the floor structure or the like. A motor 188 will drive these saw blades at a suitable speed. It will be understood that the blades 184 are spaced so as to form the lines of cut and grooving indicated at 175, 175a, see especially FIGURE 18.

The normal position of the spring-biased table 179 with respect to the fixed position of the saw blades 184 is such that these saw blades will cut completely through the panels 30 as they are pushed through the mechanism. As above pointed out, however, it is desired to groove these panels, rather than cut through them, in the panel areas directly beneath the hoops 31 and hoops and liners 32. Accordingly it is necessary to raise the support table 179 periodically as the panels 30 progress so as to elevate the hoops 31 and hoops and liners 32 above the cutting edge of these blades 184. Fixed beneath the table 179 are a plurality of brackets 189 each of which mounts a roller 190.

Mounted on a cross-member 191 extending between the posts 180 are a pair of shafts 192 having sprockets 193 fixed thereto. Also mounted on the shaft 192 are cam members 194 having cam projections 195 adapted to engage the rollers 190 periodically. When the cam projections 195 engage the rollers 190 the table 179 will be raised an amount just sufficient to permit the saw blades 184 to cut the grooves 175a beneath the hoops 31 and hoops and liners 32 whereafter the table will be returned to its normal position in which the blades 184 will cut clear through the panel 30.

Also fixed to one of the shafts 192 is a sprocket 196. A motor 197 has a driving connection with a conventional gear box including the output shafts 198 and 199. A sprocket 200 is mounted on the shaft 198 and a chain 201 engages the sprockets 196 and 200. There is also a chain 202 which engages the sprockets 193 on the shafts 192 so that the cam members 194 move together.

At the right hand end of the frame structure as viewed in FIGURE 17 there is mounted a shaft 203 having a large sprocket 204 about which the chain 161 passes. In addition to the sprockets 204 on the shaft 203 there is also a sprocket 205. Another sprocket 206 is mounted on the shaft 191 of the gear box 207. A chain 208 engages the sprockets 205 and 206.

It will be understood that the shafts 198 and 199 are so geared together that the conveyor chains 161 will move the panels 30 in proper timed relation with the saw blades 184 so that such panels are raised at each time a hoop and hoop and liner passes over these blades.

A completed hogshead panel constructed according to the method of this invention and utilizing the above-described apparatus may be shipped flat if desired or it may be immediately formed into a hogshead as such. A completed hogshead, including the top and bottoms 209, is shown in FIGURE 15. A panel 30 having the above operations performed thereon may be manually manipulated so as to form a barrel after which means are provided to connect the abutting ends together to hold it in permanent position. Following this a bottom 209 may be inserted. As shown in the aforementioned co-pending application Serial No. 510,610 this bottom member may rest on the flanges 172 of the hoops and liners 32 and it is preferred that the staple legs 166 be spaced from this flange 172 a distance just sufficient to receive nicely this bottom member 209. Following this the hogshead may be filled with tobacco or other material and it might be mentioned that such hogsheads often contain upwards of 1000 pounds of material. The top 209 is then forced on the material and manipulated so as to bring in under the flanges 172. Should the material shrink this top will be supported by the protruding staple portions 166.

*General Operation*

It is believed that the operation of the apparatus of this invention has been clearly set forth in considerable detail above. At this time, therefore, we shall only review briefly the general operation of the invention.

It will be assumed that a plurality of panels 30 with the hoops 31 and hoops and liners 32 temporarily fastened in place have been made available to an operator standing near the feed mechanism. Such panels may rest on a skid 62 or the like as indicated at FIGURE 1. The operator will engage the feet 37 of the arms 35 beneath a stack of the panels 30 and he will then move the stack to the dotted line position indicated at 210 in FIGURE 1. The anti-sway mechanism 59 aids materially in the positioning of the stack of panels in this manner. Following this the stack will be lowered between the frame members 63 of the feed mechanism and in contact with the side guides 66 which are spring biased from these frame members.

The stack of panels 30 will come to rest on the supports 80 which are fixed to the ends of the members 73. The stack will thus be supported above the supports 81, 82 and 83 mounted on the cross frame member 84.

When the cylinders 85 and their associated pistons are actuated by the catch members 97 on the chains 91 striking the switches 100 and 101 respectively the panel first resting on the supports 81, 82 and 83 will be moved toward the stapling mechanism while the lowermost panel of the stack held between the side guides 66 will fall onto the supports 81, 82 and 83. At this time the stack will then be supported on the members 79. Immediately after this the cylinders are again actuated so that the stack is moved from the members 79 to the members 80 whereupon this feed arrangement may be repeated upon next engagement of the member 97 with the switch 100.

The chains 91 and catch members 97 move the panel 30 steadily beneath the stapling heads 122. The circuit including the switches 131, 132 and 125, as controlled by the cam wheel 123, will cause a succession of staples to be passed through the hoops and hoops and liners.

Upon the last staple having been driven the panel, now having the hoops and hoops and liners permanently stapled thereto, will be moved quickly by the conveyor chains 139 to the position indicated at 30b in FIGURE 12.

The control circuit including the switches 142, 143 and 146 will cause the drag member 152, upon closing of the switch 142 by te panel resting thereon, to move such panel into position to be engaged by the catch members 162 on conveyor chains 161. The chains 161 carry the panel under hold-down rollers 176 and across a supporting surface 179 which is preferably spring-biased.

Saw blades 184 are located to cut through the panel member as it is pushed by the catch members 162 of the conveyor chain 161. Cam mechanisms serve, however, to raise the table and panel slightly each time a hoop and hoop and liner passes over the saw blades 184 so that the panel 30 is only grooved beneath these hoops and hoops and liners rather than cut clear through thus keeping the saw blades out of contact with the metal members 31 and 32. Between such members, however, the table is lowered so that the saw blades 184 cut clear through the panel 30. The lines of full cut are indicated at 175 in FIGURE 18 and the grooves at 175a. The chains 201 and 208 which drive the cam members 194 and conveyor chains 161 respectively are in turn driven from shafts 198 and 199 which are geared to provide the proper timed relation necessary with respect to the passing of the panel over the saw blades 184.

It is to be understood that modifications may be made in our apparatus and variations effected in our method without departing from the scope and spirit of this invention. Although we have shown certain preferred structures and arrangements and although we have indicated a preferred method of practicing this invention it is to be understood that we do not intend to be limited to such arrangements and structures and to such specific steps except insofar as these are specifically set forth in the subjoined claims.

Having thus described our invention what we claim as new and what we desire to protect by United States Letters Patent is:

1. In apparatus for manufacturing hogsheads from panels having hoops and hoops-and-liners temporarily secured thereto, loading mechanism for moving a stack of said panels, feed mechanism to receive the said stack from said loading mechanism, panel receiving supports beneath said feed mechanism, said feed mechanism including means to drop panels one by one from said stack onto said supports, first conveyor means to move a panel from beneath said stack on said supports, stapling means to drive staples through said hoops-and-liners into said panel as it is moved by said first conveyor means whereby to secure them permanently, second conveyor means to move said permanently stapled panel from said first conveyor means and said stapling means, a support table to receive the panel as moved by said second conveyor means, a drag to engage said panel and move it at right angles to its last line of movement, third conveyor means to effect continued movement of said panel, rotating saw blades to engage said panel as moved by said third conveyor means, and cam means to raise periodically said panel as the hoops and hoops-and-liners pass over said saw blades and to lower said panel after the hoops and hoops-and-liners have passed over said saw blades, whereby to form grooves in the panel below said hoops and hoops-and-liners and whereby to cut through said panel between successive hoops and hoops-and-liners.

2. The apparatus of claim 1 in which there are first control means for dropping a panel from said stack onto said supports only after a panel has been moved from beneath said stack, second control means to actuate said stapling means only when a panel is in position to be stapled, third control means for actuating said drag only when a panel is in position to be engaged thereby and in timed relation to said third conveyor means, and fourth control means for coordinating said cam means and said third conveyor means.

3. The apparatus of claim 2 in which said loading mechanism includes a plate, arms depending from said plate, feet on said arms to engage beneath said stack, a cable secured to said plate, a rail, a carriage movable on said rail, said cable being supported from said carriage, a cylindrical bearing pivoted to said rail, and an elongated rod pivoted to said plate and slidable in said bearing, whereby to prevent sway of said stack as supported by said cable when the carriage moves on said rail.

4. The apparatus of claim 2 in which said feed mechanism includes a plurality of upstanding frame members secured in fixed position, side guides pivoted to said upstanding frame members, and spring means urging said side guides toward one another, whereby said stack is held under pressure between said side guides.

5. The apparatus of claim 2 in which said panel dropping means includes a first shelf member and a second shelf member, said stack normally resting on said first shelf member, a horizontal T-member pivotally mounted in said apparatus, an arm extending between said first shelf member and the lower side of one end of the cross member of said T, an arm extending between said second shelf member and the upper side of the other end of the cross member of said T, a shiftable shaft, the stem of the T being connected to said shiftable shaft, and means to shift said shaft whereby to move said T-member about its pivot to withdraw said first shelf member from said stack and to move said second shelf member beneath said stack after the lowermost panel of said stack has dropped on said supports, shifting of the shaft in the reverse direction serving to drop the stack from the second shelf member onto said first shelf member without releasing another panel.

6. The apparatus of claim 5 in which said first control means includes an electric circuit having first, second and third switches, said shaft shifting means including a cylinder and piston rod connected to a source of fluid pressure, said electric circuit including a pair of solenoid controlled valves for admitting fluid to either end of said cylinder, first switch engaging means on said first conveyor means, second switch engaging means on said piston rod, and said first and second switches being normally open and in the path of the switch engaging means on said first conveyor means, whereby when said first switch is closed by engagement with said first switch engaging means a solenoid valve is actuated to shift said piston rod and shaft in a given direction and when said second switch is closed by engagement with said first switch engaging means the other solenoid valve is actuated to shift said piston rod and shaft in an opposite direction, the second switch engaging means maintaining the circuits by contact with said third switch.

7. The apparatus of claim 2 in which said stapling means comprises a stapling head for each hoop and hoop-and-liner, some of said heads at least being staggered with respect to the others.

8. The apparatus of claim 7 in which said second control means includes fourth, fifth and sixth switches in an electric circuit including said stapling heads, said switches being normally open, said fourth and fifth switches being closed by successive contact with a panel moved by said first conveyor means, said fourth switch being in a circuit with some of said stapling heads and said sixth switch, said fifth switch being in a circuit with the others of said stapling heads and said sixth switch, and means to actuate said sixth switch periodically while said panel is in successive contact with said fourth and fifth switches whereby to effect periodic actuation of said stapling heads.

9. The apparatus of claim 2 in which said second conveyor means moves at a faster rate than said first conveyor means.

10. The apparatus of claim 2 including a support rail, an elongated cylinder pivoted to said rail, a piston rod movable in said cylinder, said drag being fixed to said piston rod, a solenoid controlled valve for admitting fluid pressure to either end of said cylinder whereby to reciprocate said drag, said third control means including an electric circuit including seventh, eighth and ninth switches and said last mentioned solenoid controlled valve, said seventh and eighth switches being normally open and said ninth switch normally closed, said seventh switch being positioned for contact by a panel as moved to said support table by said second conveyor means, switch engaging means on said third conveyor means to engage said eighth switch, closing of said seventh and eighth switches together actuating said solenoid controlled valve to move said drag towards said third conveyor means, and switch engaging means on said last mentioned piston rod to engage said ninth switch when said drag has moved far enough toward said third conveyor means whereby to break the circuit through said solenoid controlled valve and cause return of said drag.

11. The apparatus of claim 2 in which said fourth control means includes drive means for said third conveyor means, other drive means for said cam means, a source of power, and common means connecting both of said last mentioned drive means to said source of power and to each other.

12. Loading mechanism comprising a fixed rail, a carriage movable on said rail, a cable, means in said carriage to raise and lower said cable, a plate, means to connect said cable to said plate, a plurality of depending arms pivoted to said plate, a foot projecting from the lower end of each arm, and a guard pivoted at one end to a said arm above its said foot and the other end of said guard abutting the respective foot of the arm to which said guard is pivoted.

13. Article moving mechanism including a support table, a rail fixed above said table, a drag resting on said table, an elongated cylinder pivoted to said rail, a piston and piston rod in said cylinder, said drag being fixed to said piston rod, and means to reciprocate said piston in said cylinder whereby to reciprocate said drag.

14. The mechanism of claim 13 in which rollers are mounted on said drag for engagement with said support table.

15. The mechanism of claim 13 in which a counterweight is provided for said cylinder, said weight being fastened to a cable fixed to said cylinder and passing over a pulley mounted on said rail.

16. A saw mechanism including a base frame, a support table resiliently mounted on said base frame, rotating saw blades extending through slots in said table, first drive means to raise and lower said table with respect to said saw blades, conveyor means for moving an article to be sawed along said support table, second drive means to move said conveyor means, and control means interconnecting said first drive means and said second drive means so that said table is raised and lowered in accordance with the movement of said conveyor means.

17. The mechanism of claim 16 in which the means for raising and lowering the table includes a plurality of brackets fixed to and depending from said support table, shafts mounted below said support table, rollers on said brackets, cam wheels on said shafts in registry with said rollers, and said control means including means to rotate said shafts in time with said conveyor means.

18. A method for insuring the continuous production of hogsheads which method comprises: temporarily securing hoops and hoops-and-liners to hogshead forming panels, assembling these hogshead panels in stacks, loading these stacked panels in a feeding station, feeding these panels one by one to a panel moving mechanism, moving said panels one by one from said feeding station, stapling said hoops and hoops-and-liners permanently to said panels as they are moved from said feeding station, moving said permanently stapled moving panels into engagement with saw means, and sawing said permanently stapled panels in a plurality of lines of cut at right angles to said hoops and hoops-and-liners so as to groove said panels directly beneath said hoops and hoops-and-liners and to cut clear through said panels between said hoops and hoops-and-liners.

References Cited in the file of this patent

UNITED STATES PATENTS

| | | |
|---|---|---|
| 825,778 | Von Phul | July 10, 1906 |
| 901,548 | Nelson | Oct. 20, 1908 |
| 956,890 | Daniels | May 3, 1910 |
| 1,067,360 | McSorley | July 15, 1913 |
| 1,210,520 | Oliver | Jan. 2, 1917 |
| 1,353,989 | Christensen | Sept. 28, 1920 |
| 1,602,999 | Brown | Oct. 12, 1926 |
| 1,694,084 | Straight | Dec. 4, 1928 |
| 1,699,608 | Cooke | Jan. 22, 1929 |
| 1,745,049 | Systrom | Jan. 28, 1930 |
| 1,789,669 | Cooke | Jan. 20, 1931 |
| 1,818,374 | Bennington | Aug. 11, 1931 |
| 1,855,441 | Crouse | Apr. 26, 1932 |
| 1,969,170 | Erickson | Aug. 7, 1934 |
| 2,264,776 | Spiller | Dec. 2, 1941 |
| 2,277,235 | Kidder | Mar. 24, 1942 |
| 2,352,764 | Bell | July 4, 1944 |
| 2,435,765 | Anderson | Feb. 10, 1948 |
| 2,478,665 | Roitz | Aug. 9, 1949 |
| 2,509,870 | Larsson | May 30, 1950 |
| 2,569,355 | Tubbs | Sept. 25, 1951 |
| 2,589,600 | Burkholder | Mar. 18, 1952 |
| 2,862,291 | Clark | Dec. 2, 1958 |

FOREIGN PATENTS

| | | |
|---|---|---|
| 474,573 | Germany | Apr. 4, 1929 |